United States Patent [19]
Silveri

[11] Patent Number: 5,401,373
[45] Date of Patent: Mar. 28, 1995

[54] ELECTROLYTIC POOL PURIFIER

[76] Inventor: Michael A. Silveri, 483 Skylake Ct., Incline Village, Nev. 89451

[21] Appl. No.: 240,964

[22] Filed: May 10, 1994

Related U.S. Application Data

[63] Continuation of Ser. No. 105,365, Aug. 11, 1993, abandoned, which is a continuation of Ser. No. 960,265, Oct. 13, 1992, abandoned, which is a continuation of Ser. No. 770,074, Oct. 1, 1991, abandoned, which is a continuation-in-part of Ser. No. 759,692, Sep. 6, 1991, abandoned, which is a continuation of Ser. No. 680,591, Mar. 28, 1991, abandoned, which is a continuation of Ser. No. 597,085, Oct. 15, 1990, abandoned, which is a continuation-in-part of Ser. No. 424,305, May 6, 1989, Pat. No. 4,992,156.

[51] Int. Cl.6 .................. C25B 9/00; C25B 15/08
[52] U.S. Cl. ................................ 204/269; 204/279; 204/273; 210/169
[58] Field of Search ........ 204/269, 275, 279, 276–278, 204/267, 270, 273; 210/169

[56] References Cited

U.S. PATENT DOCUMENTS

| | | | |
|---|---|---|---|
| 844,262 | 2/1907 | Dieterich | 204/275 X |
| 2,864,750 | 12/1958 | Hughes, Jr et al. | 204/149 |
| 2,887,444 | 5/1959 | Lindstaedt | 204/152 |
| 3,092,566 | 6/1963 | Negus | 204/240 |
| 3,222,269 | 12/1965 | Stanton | 204/270 |
| 3,222,270 | 12/1965 | Edwards | 204/269 |
| 3,223,242 | 12/1965 | Murray | 210/139 |
| 3,305,472 | 2/1967 | Oldershaw et al. | 204/268 |
| 3,334,035 | 8/1967 | Dews et al. | 204/130 |
| 3,351,542 | 11/1967 | Oldershaw et al. | 204/149 |
| 3,361,663 | 1/1968 | Murray et al. | 204/278 |
| 3,378,479 | 4/1968 | Colvin et al. | 204/248 |
| 3,458,414 | 7/1969 | Crane et al. | 204/149 |
| 3,552,568 | 1/1971 | Wade | 210/169 X |
| 3,563,879 | 2/1971 | Richards et al. | 204/272 |
| 3,669,857 | 6/1972 | Kirkham et al. | 204/151 |
| 3,684,460 | 8/1972 | Arneson | 23/267 A |
| 3,736,322 | 5/1973 | Helber et al. | 204/266 |
| 3,752,747 | 8/1973 | Treharne et al. | 204/149 |
| 3,766,045 | 10/1973 | Itakura et al. | 204/275 |
| 3,767,557 | 10/1973 | Lamm | 204/263 |
| 3,793,178 | 2/1974 | Austin et al. | 204/272 |
| 3,835,018 | 9/1974 | Casanovas et al. | 204/228 |
| 3,835,020 | 9/1974 | Galneder | 204/268 |
| 3,893,902 | 7/1975 | Loftfield et al. | 204/95 |
| 3,945,905 | 3/1976 | Persson | 204/212 |

(List continued on next page.)

FOREIGN PATENT DOCUMENTS

| | | | |
|---|---|---|---|
| 205712 | 9/1973 | Argentina. | |
| 206934 | 3/1974 | Argentina. | |
| 206935 | 5/1974 | Argentina. | |
| 43263 | 12/1973 | Australia. | |
| 512425 | 6/1977 | Australia. | |
| 126365 | 4/1979 | Australia. | |
| 11632 | 8/1983 | Australia. | |
| 569026 | 8/1983 | Australia. | |
| 2080449 | 1/1971 | France. | |
| 1140060 | 2/1971 | France. | |
| 2227182 | 9/1990 | Japan | 204/242 |
| WO8601543 | 3/1986 | WIPO. | |

OTHER PUBLICATIONS

Halogen Systems Advertisement (Mailer), distributed Sep. 1989.
Halogen Systems Advertisement (Flyer), distributed Nov. 1989.
Marks, L., *Mechanical Engineering Handbook*, pp. 258–259 (3rd Ed. 1930).

*Primary Examiner*—Donald R. Valentine
*Attorney, Agent, or Firm*—Knobbe, Martens, Olson & Bear

[57] ABSTRACT

A water purifier comprising an electrolytic cell housed in an enclosure and an attaching apparatus. The enclosure attaches over an outlet fitting of a water circulation line in a swimming pool by the attaching apparatus. The attaching apparatus and the enclosure define apertures and outlet openings, respectively, having increasing areas in the direction of the water flow. This configuration increases flow rates through the apertures and outlet openings; the increased flow rates break off scale formations extending into the center of the apertures and outlet openings and thereby prevent scale from clogging the purifier.

15 Claims, 7 Drawing Sheets

U.S. PATENT DOCUMENTS

| | | | |
|---|---|---|---|
| 3,957,599 | 5/1976 | Lindsay et al. | 204/269 |
| 4,085,028 | 4/1978 | McGallum | 204/269 |
| 4,097,356 | 6/1978 | Yates | 204/237 |
| 4,100,052 | 7/1978 | Stillman | 204/268 |
| 4,121,991 | 10/1978 | Miller et al. | 204/260 |
| 4,124,480 | 11/1978 | Stevenson | 204/268 |
| 4,129,493 | 12/1978 | Tighe et al. | 204/228 |
| 4,136,005 | 1/1979 | Persson et al. | 204/266 |
| 4,193,858 | 3/1980 | King | 204/268 |
| 4,196,068 | 4/1980 | Scoville | 204/255 |
| 4,200,230 | 4/1980 | Gould | 239/66 |
| 4,201,651 | 5/1980 | Themy | 204/217 |
| 4,202,738 | 5/1980 | Stillman | 204/95 |
| 4,229,272 | 10/1980 | Yates | 204/128 |
| 4,248,690 | 2/1981 | Conkling | 204/268 |
| 4,255,246 | 3/1981 | Davis et al. | 204/228 |
| 4,256,552 | 3/1981 | Sweeney | 204/98 |
| 4,263,114 | 4/1981 | Shindell | 204/149 |
| 4,290,873 | 9/1981 | Weaver | 204/228 |
| 4,334,968 | 6/1982 | Sweeney | 204/96 |
| 4,337,136 | 6/1982 | Dahlgren | 204/242 |
| 4,361,471 | 11/1982 | Kosarek | 204/128 |
| 4,363,713 | 12/1982 | Bindon | 204/278 |
| 4,368,550 | 1/1983 | Stevens | 4/507 |
| 4,411,759 | 10/1983 | Olivier | 204/260 |
| 4,419,207 | 12/1983 | Bindon | 204/237 |
| 4,422,919 | 12/1983 | Fabian et al. | 204/270 |
| 4,472,256 | 9/1984 | Hilbig | 204/266 |
| 4,492,618 | 1/1985 | Eder | 204/152 |
| 4,525,253 | 6/1985 | Hayes et al. | 204/149 |
| 4,555,323 | 11/1985 | Collier | 204/258 |
| 4,565,617 | 1/1986 | Ahuja | 204/229 |
| 4,584,106 | 4/1986 | Held | 210/754 |
| 4,599,159 | 7/1986 | Hilbig | 204/266 |
| 4,613,415 | 9/1986 | Wreath et al. | 204/98 |
| 4,701,265 | 10/1987 | Carlsson et al. | 210/744 |
| 4,714,534 | 12/1987 | Fair et al. | 204/269 |
| 4,719,018 | 1/1988 | Przybylski | 210/169 |
| 4,767,511 | 8/1988 | Aragon | 204/128 |
| 4,789,448 | 12/1988 | Woodhouse | 204/228 |
| 4,790,923 | 12/1988 | Stillman | 204/268 |
| 4,818,389 | 4/1989 | Tobias et al. | 210/269 |
| 4,861,451 | 8/1989 | David | 204/230 |
| 4,935,980 | 6/1990 | Leginus et al. | 210/169 X |
| 4,936,979 | 6/1990 | Brown | 204/228 X |
| 4,986,906 | 1/1991 | Dadisman | 210/169 |
| 4,992,156 | 2/1991 | Silveri | 204/228 |
| 4,997,540 | 3/1991 | Howlett | 204/271 |
| 5,013,417 | 5/1991 | Judd, Jr. | 204/228 |
| 5,034,110 | 7/1991 | Glore et al. | 204/228 |
| 5,037,519 | 8/1991 | Wiscombe | 204/237 |
| 5,059,296 | 10/1991 | Sherman | 204/228 |
| 5,094,734 | 3/1992 | Torrado | 204/234 |
| 5,228,964 | 7/1993 | Middleby | 204/194 |
| 5,254,226 | 10/1993 | Williams et al. | 204/128 |

ELECTROLYTIC POOL PURIFIER

RELATED APPLICATIONS

This application is a continuation of application Ser. No. 08/105,365, filed Aug. 11, 1993, now abandoned, which is a continuation of copending U.S. patent application Ser. No. 07/960,265, filed Oct. 13, 1992, now abandoned, which is a continuation of application Ser. No. 07/770,074, filed Oct. 1, 1991, now abandoned, which is a continuation-in-part of application Ser. No. 07/759,692, filed Sep. 6, 1991, now abandoned, which is a continuation of an application Ser. No. 680,591, filed Mar. 28, 1991, now abandoned, which is a continuation of an application Ser. No. 597,085, filed Oct. 15, 1990, now abandoned which is a continuation-in-part of application Ser. No. 07/424,305, filed Mar. 6, 1989, now U.S. Pat. No. 4,992,156.

BACKGROUND OF THE INVENTION

1. Field of the Invention

The present invention relates to a water purifier, and more particularly to a submerged electrolytic cell.

2. Description of Related Art

Sodium hypochlorite is commonly used as a sanitizing agent in swimming pools, and the like, to control bacteria growth. Typical pool maintenance requires adding liquid sodium hypochlorite to pool water. Some pool owners, however, use electrolytic cell devices in their pools or in their filtration systems to produce sodium hypochlorite by electrolysis. Examples of electrolytic cells used to generate sanitizing agents are disclosed in U.S. Pat. Nos. 4,992,156 and 4,790,923.

In water having a hardness greater than 700 parts per million ("hard water"), scale deposits from the water and builds up on surfaces adjacent to a water flow. If an electrolytic cell—and for that matter, pool equipment in general—is used in hard water, scale build-up causes water flow problem. Scale typically builds up and clogs small openings and conduits in the equipment. Thus, some manufacturers recommend using their equipment in water having a total hardness less than 500 parts per million.

SUMMARY OF THE INVENTION

The nozzle of the present invention comprises a nozzle body having an elongated tubular shape which defines an interior cavity to receive water from a water circulation line of a pool. The nozzle body includes an edge defining an aperture. At least a portion of the edge angles outwardly in the radial direction, giving the aperture an area increasing from an inner surface of the body to an outer surface of the body. The nozzle additionally comprises a nozzle connector configured to couple the nozzle body to the water circulation line.

In a preferred embodiment, the nozzle connector comprises a tubular body having a threaded outer surface engaging the water circulation line. The nozzle body defines a plurality of apertures, each aperture having a minimum area sized to produce a sufficient flow rate of water through the apertures to break off scale formations projecting from the aperture edges. The minimum area of the apertures preferably ranges between about 1/16th inch and about ⅛th inch, and may equal approximately 3/16th inch. The edges of the apertures angle outwardly from a radius of the tubular nozzle body by an incline angle equal to about 30° to 60°, and may equal approximately 45°.

In accordance with another aspect of the present invention, a water sanitizing apparatus mounts in a pool having a water circulation line. The sanitizing apparatus comprises an electrolytic cell having a plurality of electrodes and an enclosure having an internal cavity which houses the electrolytic cell. The sanitizing apparatus further includes a nozzle which in a preferred embodiment comprises a nipple. The nipple has an elongated tubular shape which defines an internal flow passage to receive water from the circulation line. The nipple includes an edge defining an aperture, at least a portion of the edge angles outwardly in the radial direction to define an aperture which increases in area from an inner surface of the nipple to an outer surface of the nipple. In assembly, the nipple aperture is positioned within the internal cavity of the enclosure.

In a preferred embodiment, the nipple defines a plurality of apertures equally spaced around the circumference of the nipple, and may define four rectangular apertures. With the electrodes juxtaposed in the interior cavity, the length of the rectangular apertures is greater than a distance across the juxtaposed series of electrodes. The apertures have a minimum area sized to produce a sufficient flow rate of water through the apertures to break off scale formations projecting from the nipple edges. The nipple is preferably constructed of a high molecular weight polyethylene.

The enclosure preferably defines an aperture and the electrolytic cell includes a bore passing through the electrodes which aligns with the enclosure aperture in assembly. The enclosure aperture and the bore receive a cap end of the nipple. The apparatus additionally comprises a cap removably engaging the nipple cap end to seal the nipple cap end and secure the enclosure onto the nipple.

The enclosure further includes an outlet opening allowing water to flow through the enclosure interior cavity and into the pool. The opening is defined between chamfer edges extending outwardly from the center of the enclosure. The chamfer edges are sufficiently close together to produce an ample flow rate of water through the outlet to break off scale formations projecting from the chamfer edges.

In accordance with a third aspect of the present invention, there is defined a water sanitizing apparatus for mounting in a pool having a water circulation line. The sanitizing apparatus comprises an enclosure having an internal cavity and an outlet opening; chamfer edges define the opening. The apparatus further comprises a tubular nipple communicating with the water circulation line and defining an aperture. The nipple extends partially into the interior cavity to position the aperture therein. Water flows through the nipple, into the internal cavity, out of the outlet opening and into the pool.

In a preferred embodiment, the chamfer edges are sufficiently close together to produce an ample flow rate of water through the outlet to break off scale formations projecting from the chamfer edges.

In accordance with a preferred method of installing a water sanitizing apparatus in a pool having a water circulation line, an electrical wire is connected to the sanitizing apparatus and the wire is threaded through a portion of the water circulation line. An elongated nipple is coupled with an outlet fitting of the water circulation line and extends outwardly from the pool wall. The enclosure is positioned beneath the surface of the pool and in front of the water circulation line. The enclosure is subsequently slid over the nozzle to a position proximate to the pool wall. A cap secures the enclosure onto the nozzle, between the pool wall and the cap, by engaging the extended nozzle end.

DETAILED DESCRIPTION OF THE PREFERRED EMBODIMENT

Figure 1:
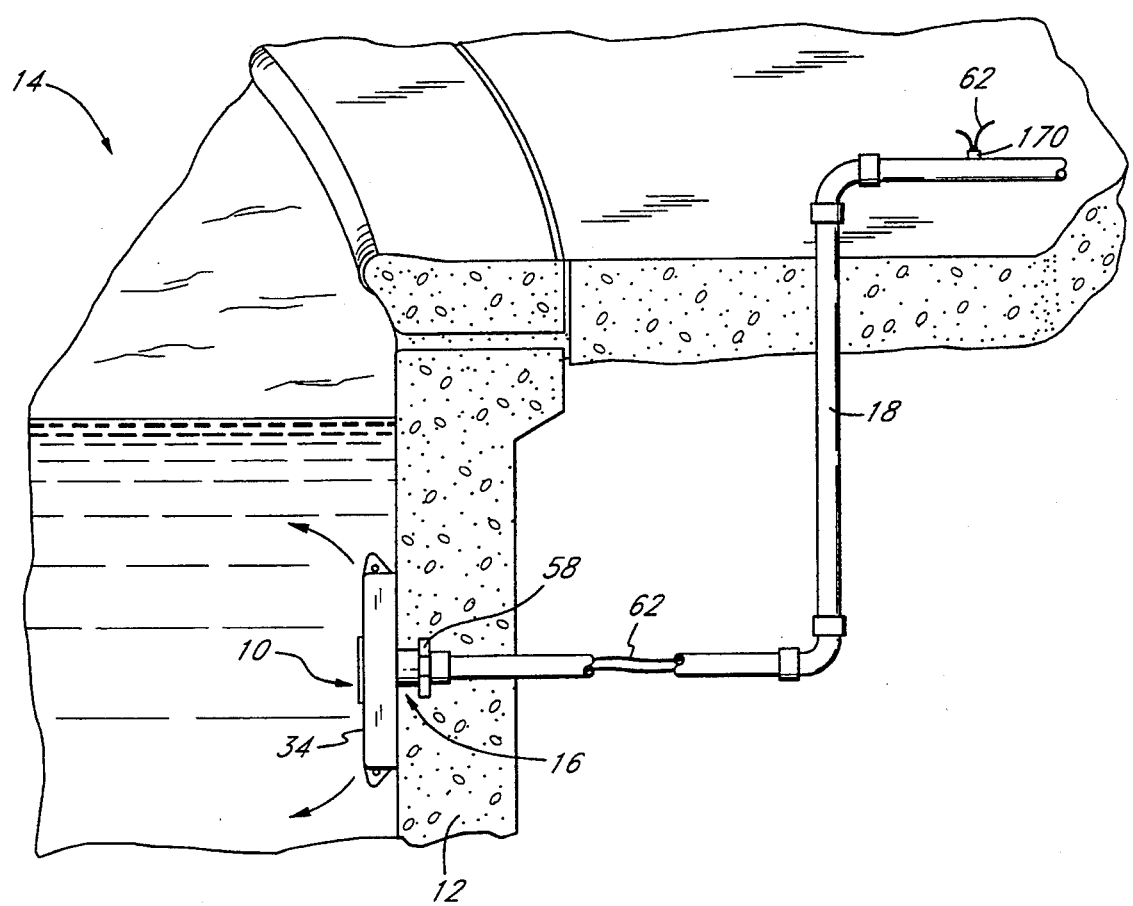
FIG. 1 illustrates a water purifier in accordance with one embodiment of the present invention attached to a side wall of a swimming pool.

FIG. 1 illustrates a sanitizing apparatus or purifier 10 of the present invention secured to a wall 12 of a swimming pool 14. Although the discussion of the purifier 10 proceeds in connection with a swimming pool, it is understood that the purifier 10 can also work with spas (i.e., Jacuzzies ®), water fountains and the like.

Figure 2:
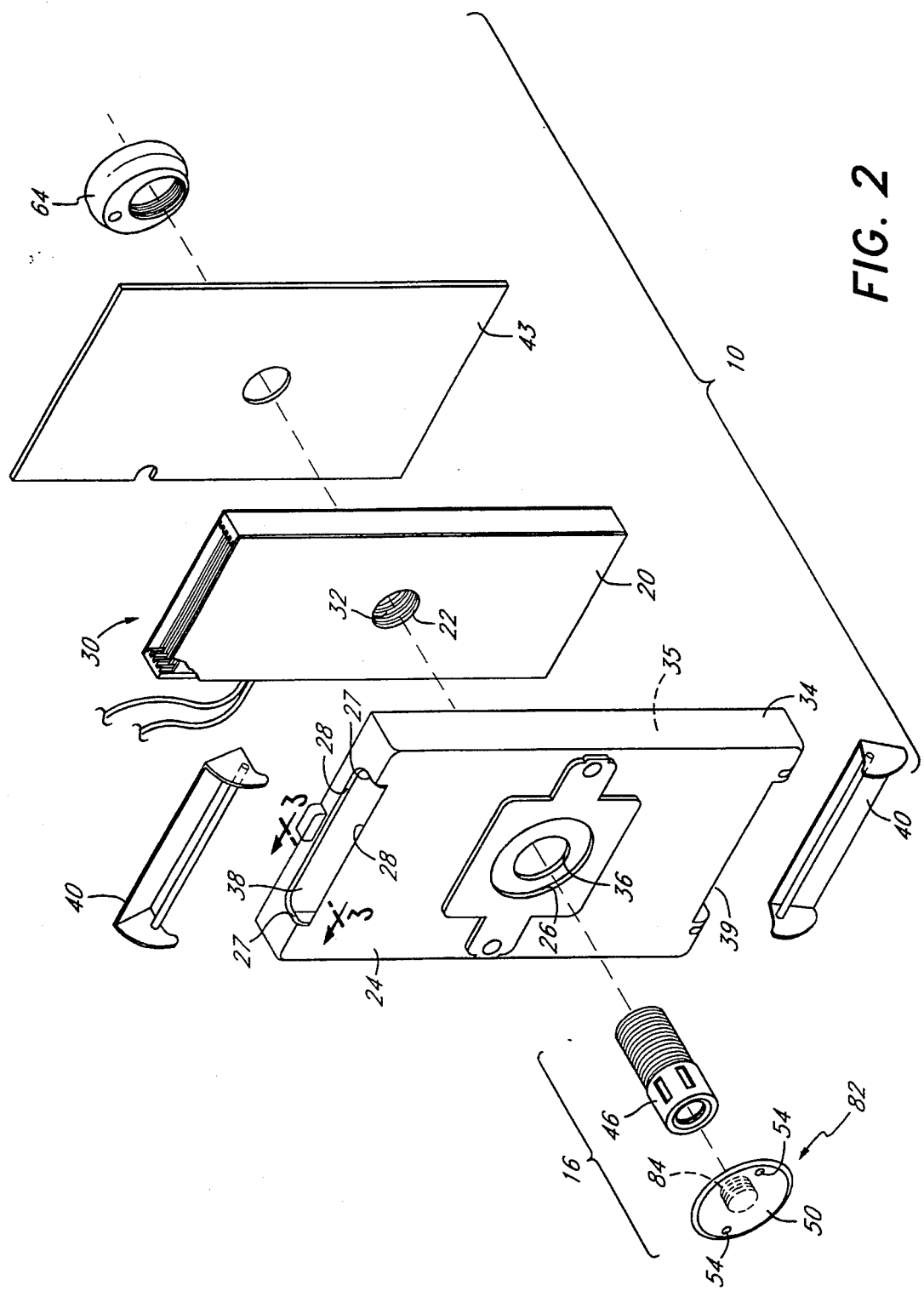
FIG. 2 is an exploded perspective view of the purifier of FIG. 1.

Referring to FIGS. 1 and 2, the purifier 10 comprises an electrolytic cell 30 housed in an enclosure 34 and an attaching apparatus 16 for securing the electrolytic cell 30 to the pool wall 12. The attaching apparatus 16 is located at an exit port of a water circulation line 18. As a result, pressurized water exiting the water circulation line 18 flows through the enclosure 34, passing over the electrolytic cell 30. As discussed in detail below, the resulting water stream aids in reducing scale build-up on the electrolytic cell 30, the enclosure 34 and the attaching apparatus 16.

As illustrated in FIG. 2, the electrolytic cell 30 is generally configured in accordance with the teachings of U.S. Pat. No. 4,992,156, issued on Feb. 12, 1991, which is hereby incorporated by reference. The electrolytic cell 30 comprises a plurality of juxtaposed electrode plates 20. Each electrode plate 20 has a rectangular shape and defines an aperture 22 at its center. As juxtaposed, the electrode plates 20 define a cylindrical bore 32 having ,an axis perpendicular to the electrode plates 20.

The enclosure 34 fully encompasses the electrolytic cell 30 within an internal cavity 35. The enclosure 34 is molded of a thermoplastic, and defines an aperture 36 extending through the enclosure 34; the aperture 36 aligns with the bore 32 of the electrolytic cell in assembly. As a result, a portion of the attaching apparatus 16 (namely a nipple 46) passes partially through the enclosure 34 and the electrolytic cell 30 in assembly. A front panel 24 of the enclosure includes a recess 26 having a larger diameter than the aperture 36 and circumscribing the aperture 36.

The enclosure 34 additionally comprises a top opening 38 and a bottom opening 39, providing exit ports for water flowing through the enclosure 34 from the water circulation line 18. The openings 38, 39 also provide a flow path for water circulating through the enclosure 34 as a result of the electrolytic process. With a circulation pump off, the electrolysis generates gaseous bubbles which travel through the enclosure 34 towards the surface of the pool water. The natural movement of the bubbles produces a current flow of water through the enclosure 34, entering through the bottom opening 39 and exiting through the top opening 38.

Figure 3:
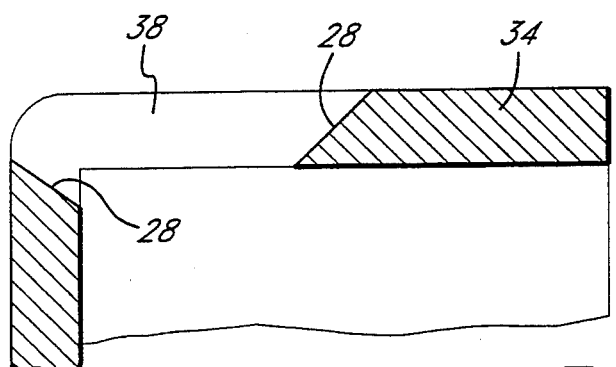
FIG. 3 is a partial cross-sectional view taken along line 3—3 of FIG. 2.

As illustrated in FIG. 2, the top opening 38 has generally a rectangular configuration defined by four edge surfaces 27, 28. Two of the edge surfaces 28, as best seen in FIG. 3, comprise chamfers, angling away from the defined opening 38. The opening 38 increase in area in an outward direction as a result of the chamfer configuration of the edge surfaces 28. As used herein, the "area" of an opening aperture, or orifice is measured across a plane of the opening, aperture or orifice perpendicular to the water flow. The bottom opening 39 has an identical configuration. This configuration increases water flow rate through the openings 38, 39; water flowing through the openings 38, 39 remains in a concentrated stream and does not diffuse at the outer edges of the openings 38, 39. As a result, the flow rate through the openings 38, 39 increases as water passes through the openings 38, 39.

The increased flow rate reduces scale formations which clog the openings 38, 39. Scale, in hard water, deposits on the edges 27, 28 of the openings 38, 39 and builds outwardly in a stalagmite fashion, away from the edge surfaces 27, 28. The increased flow, however, limits the growth of the scale deposit. The increased water current fractures the stalagmite structure extending into the center of the current. Thus, scale is less likely to bridge the openings 38, 39 and to reduce the flow of water through the purifier 10.

About each opening 38, 39, the enclosure includes a directional diffuser 40. The directional diffusers direct water flow exiting the openings 38, 39 towards the center of the pool 14. As illustrated in FIG. 2, each diffusers preferable includes a metal rod 41 extending longitudinally across the diffuser. The rods act as a grate or guard, preventing objects smaller than the openings 38, 39 from entering the openings.

Figure 4:
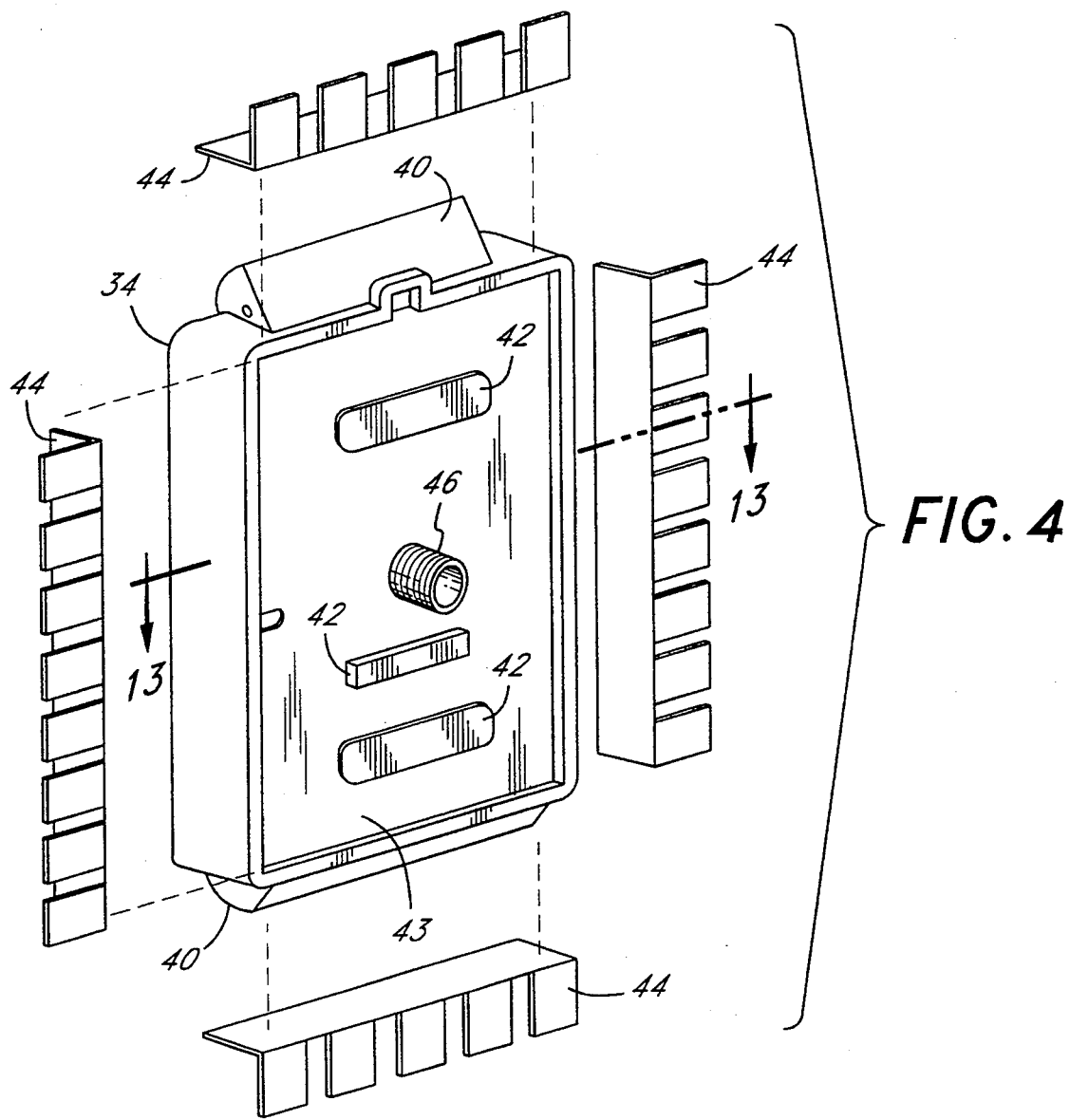
FIG. 4 is a partial rear perspective view of the purifier of FIG. 1, illustrated with wall spacers.
Figure 5:
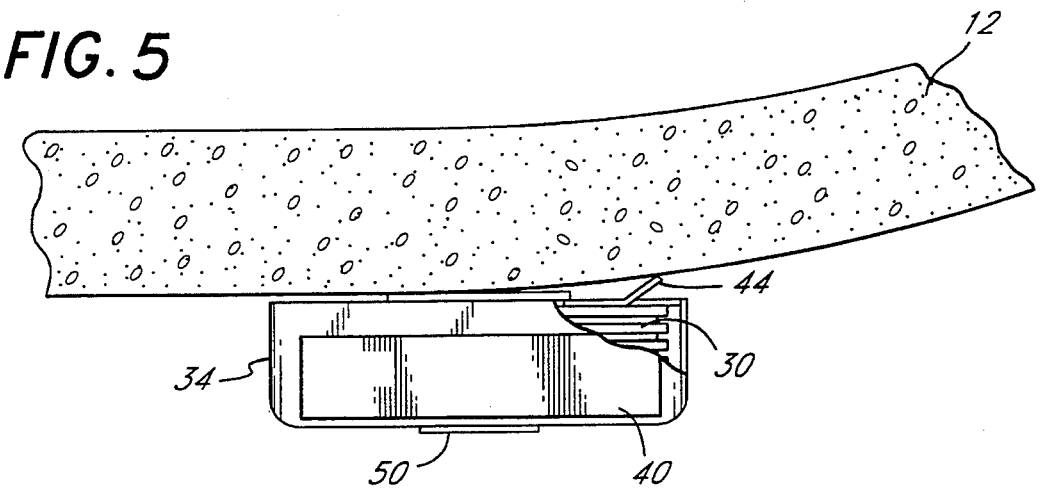
FIG. 5 is a plan view of the purifier of FIG. 1 mounted to a curved pool wall.

Referring to FIG. 4, the enclosure 34 also includes two flange brackets 42 integrally mounted onto a back panel 43 of the enclosure 34. These brackets 42 receive several spacers 44 which wedge between the enclosure 34 and the pool wall 12 to blend with the contoured (or otherwise not flat) surface of the pool wall 12, as illustrated in FIG. 5. Although FIGS. 4 and 5 illustrate the purifier 10 as having four rectangular spacers 44, the proper combination and shape of the spacers 44 is dictated by the shape and contour of the pool wall 12.

Figure 6:
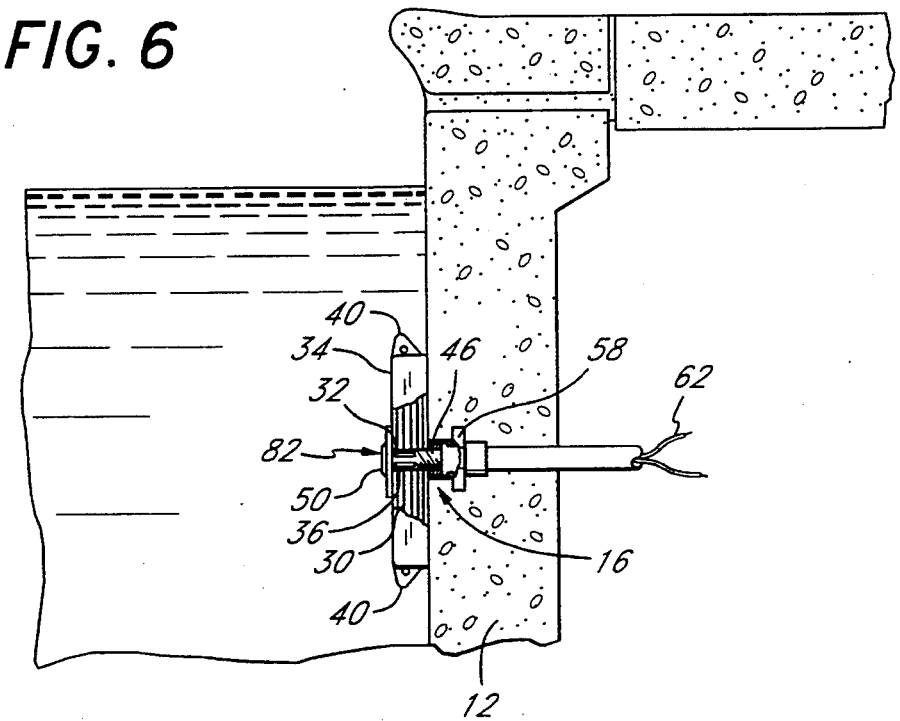
FIG. 6 is a partial cross-sectional view of the purifier of FIG. 1 attached to an existing pool fitting embedded in the pool wall.

Referring to FIG. 6, the attaching apparatus 16 secures the enclosures 34 to the pool wall 12. The attaching apparatus advantageously utilizes an existing fitting 58 of the water circulation line 18 located on the pool wall 12. Pools commonly include at least one exit port fitting 58 positioned in the pool wall 12 below the water line and in communication with the water circulating system. Employing the existing fitting 58 reduces the cost and time associated with installation of the purifier 10.

Figure 7:
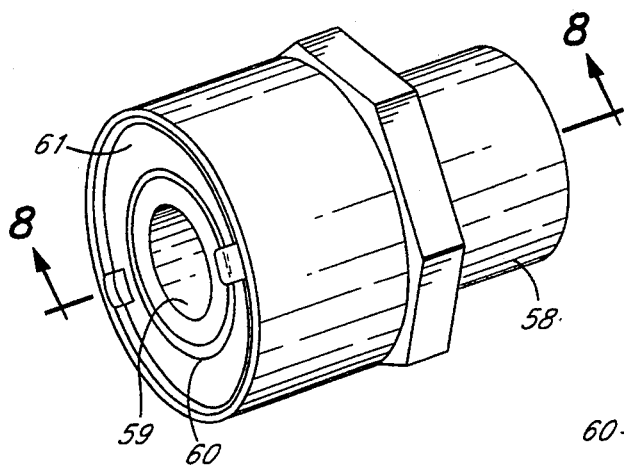
FIG. 7 is a perspective view of a unmodified pool fitting.
Figure 8:
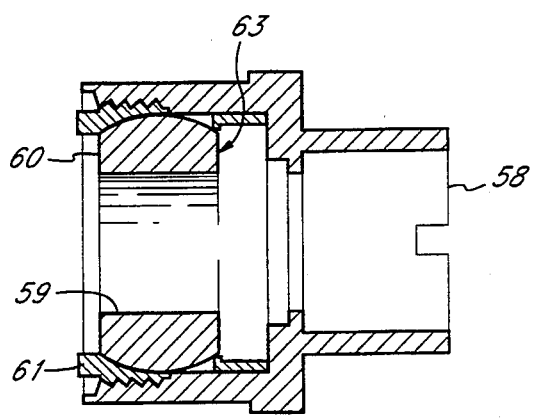
FIG. 8 is a cross-sectional view taken along line 8—8 of FIG. 7.

As illustrated in FIGS. 7 and 8, the fitting 58 conventionally includes an eyeball-shaped directional discharger 60 having a central aperture 59. The directional discharger 60 has a spherical shape with two symmetric sides truncating the spherical shape along vertical planes. As best seen in FIG. 8, a correspondingly shaped retainer ring 61 secures the directional discharger 60 within a socket 63 of the fitting 58 and thereby permits rotation of the discharger 60 in the fitting socket 63.

Figure 9:
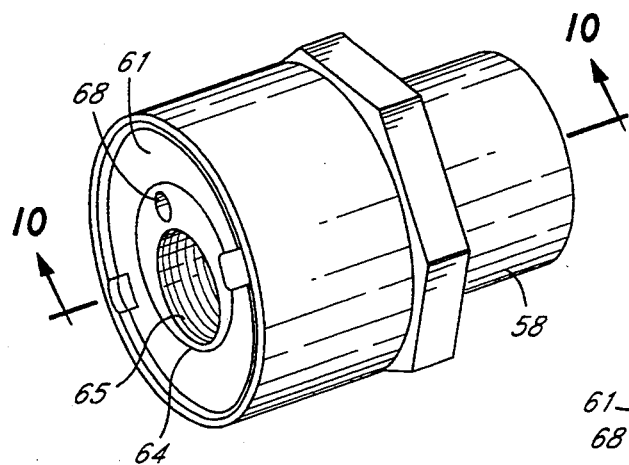
FIG. 9 is a perspective view of the pool fitting of FIG. 7, with a directional nozzle configured in accordance with the present invention inserted into the fitting.
Figure 10:
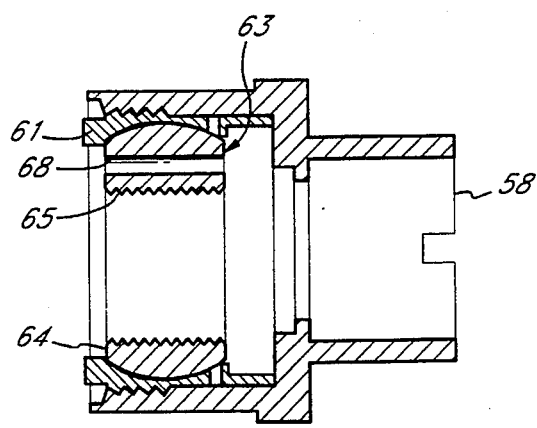
FIG. 10 is a cross-sectional view taken along line 10—10 of FIG. 9.

Referring to FIGS. 9 and 10, the attaching apparatus 16 comprises a similarly shaped directional discharger 64 having a thread hole 65 offset from the center of the directional discharger 64 and a wire passageway 68. The existing retainer ring 61 retains the modified directional discharger 64 within the existing socket 62, as illustrated in FIG. 10.

Figure 11:
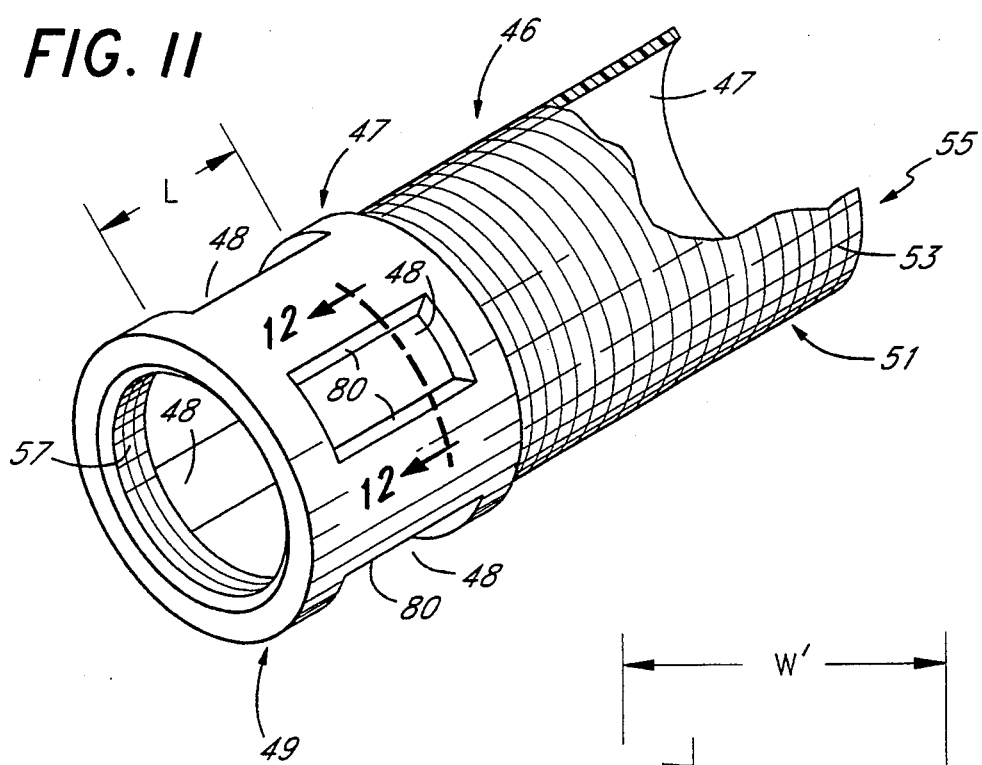
FIG. 11 is a perspective view of a nipple of FIG. 2.

As seen in FIGS. 2 and 6, the attaching apparatus 16 additionally comprises a nipple or nozzle 46. FIG. 11 illustrates the nipple 46 having a generally tubular shape body 45 with an internal flow passage 47. The nipple body 45 defines a plurality of equally spaced apertures 48 proximate to a cap end 49. Although FIG. 11 illustrates the nipple body 45 as defining four apertures, it is understood that any number of apertures 48 can be used as well. Proximate to the apertures 48, the nipple 46 includes internal threads 57 extending into the flow passage 47 from the cap end 49. The nipple 46 also includes a connector 51 having a threaded exterior 53 extending from an engagement end 55 which engages the threaded hole 65 of the directional discharger 64 in assembly.

Figure 12:
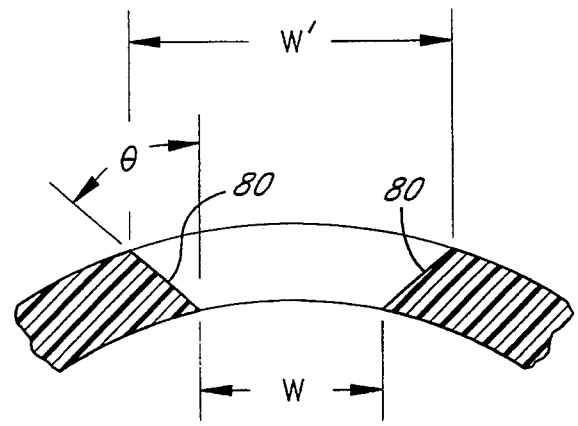
FIG. 12 is a partial cross-sectional view taken along line 12—12 of FIG. 11.

To prevent scale accumulation in the nipple apertures 48, the apertures 48 have a configuration increasing in area in the radial direction perpendicular to the water flow. As illustrated in FIG. 12, chamfered edges 80 define the apertures 48; the edges 80 angle outwardly from a radius of the tubular nipple 46 by an incline angle $\theta$. Preferably, the incline angle $\theta$ ranges between 30° and 60°, and more preferably equals about 45°. As discussed above in connection with the enclosure openings 38, 39, this configuration increases flow rate through the apertures 48. The resulting water jet fractures scale formations extending from the chamfered edges 80.

Although FIG. 11 illustrates the apertures 48 as having a rectangular configuration, it is understood that other aperture configurations, such as, for example, oval or circular shapes, can be used as well. The particular aperture configuration must be sized to produce a sufficient flow rate to break off scale formation accumulating on the edges 80 of the apertures 48. The aperture size, however, should not be too small, as scale and other objects will easy clog the apertures 48.

For example, the rectangular apertures 48 illustrated in FIGS. 11 and 12 have lengths L in the longitudinal direction, widths W at the interior surface of the nipple body, and widths W' at the exterior surface of the nipple body. These dimensions are measured perpendicular to the water flow through the apertures 48. Preferably, the widths W of the apertures 48 ranges between about 1/16th inch and ⅜th inch, and more preferably equals about 3/16th inch for water flowing into the nipple 46 under 2–3 pounds per square inch of pressure.

Figure 13:
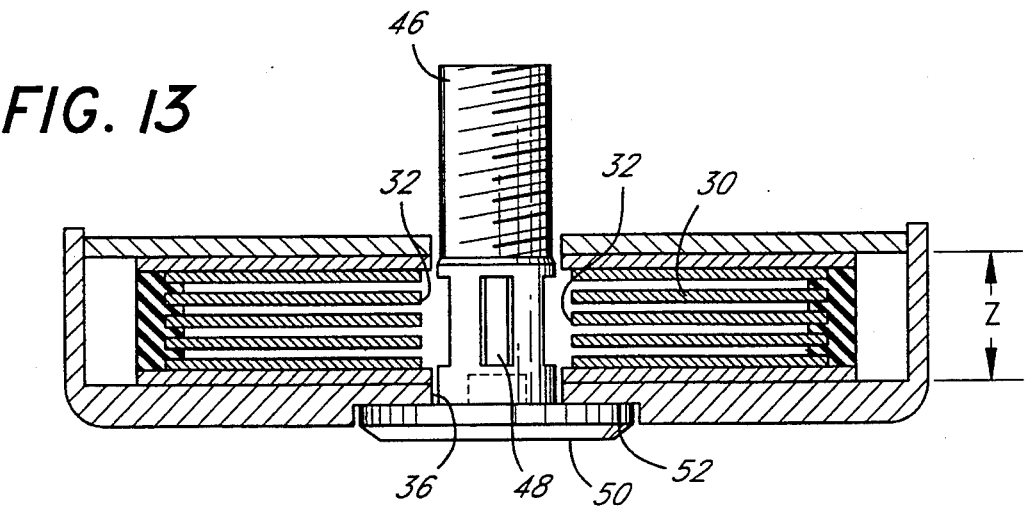
FIG. 13 is a cross-sectional view taken along line 13—13 of FIG. 4.

As illustrated in FIGS. 11 and 13, the longitudinal length L of the aperture chamfer edges 80 is equal to about the stacked width Z of the juxtaposed electrodes 20. As a result, water exiting the apertures 48 flows over the electrode surfaces.

Referring to FIGS. 2 and 6, the attaching apparatus 16 further includes a cap 82 comprising a flange disk 50 and a threaded shank 84 (FIG. 2). The threaded shank 84 is sized to engage the internal threads 57 of the nipple 46, without interfering with water flow through the nipple apertures 48. Although the FIGS. 2, 6 and 11 illustrate the cap 82 as including the externally threaded shank 84, it is contemplated that the cap could include internal threads, and the nipple cap end 49 could include external threads. Additionally, other type of connections, such as, for example, a male-female snap-type connector, can be used as well to removably connect together the cap 82 and cap end 49 of the nipple 46.

The flange disk 50 has a shape commensurate with that of the enclosure recess 26 and is larger in diameter than the enclosure aperture 36. In assembly, the flange disk 50 fits flush with the front panel 24 of the enclosure 34. The flange disk 50 defines two or more cavities 54 that mate with an installation tool. The tool is used to tighten the cap 82 onto the nipple 46, and is used in turn to tighten the nipple 46 into the directional discharger 64.

The attaching apparatus 16, especially the nipple 46, is preferably formed of a generally inert plastic, such as, for example, Teflon ® or a high molecular weight polyethylene. Scale does not adhere well to these types of plastics.

In assembly, the directional discharger 64 fits within the socket 62 of the existing fitting 58 with the retainer ring 61 securing the discharger 64 in place. The nipple 46 threads into the threaded discharger hole 65 and cantilevers away from the pool wall 12. An electrical wire 62 (FIG. 6), connected to the electrolytic cell 30, threads through the wire passageway 68. The enclosure 34 secures to the pool wall 12 by sliding over the nipple 46; the enclosure aperture 36 and electrode bore 32 receive the nipple 46. The cap 82 secures the enclosure 34 and electrolytic cell 30 in place by threading into the end cap 49 of the nipple 46. As assembled, the enclosure 34 abuts against the pool wall 12; however, if the pool wall is curved, edge spacers 44 are placed against the flange brackets 42 prior to tightening. The edge spacers 44 can be trimmed or contoured to the pool wall 12 configuration.

Assembled with the fitting socket 62, the nipple communicates with the water circulation line 18. Pressurized water flows inside the tubular nipple 46 and disperses through the apertures 46. As mentioned above, water exiting the apertures 46 flows over each electrode surface 20 and exits through the outlet openings 38, 39.

Figure 14:
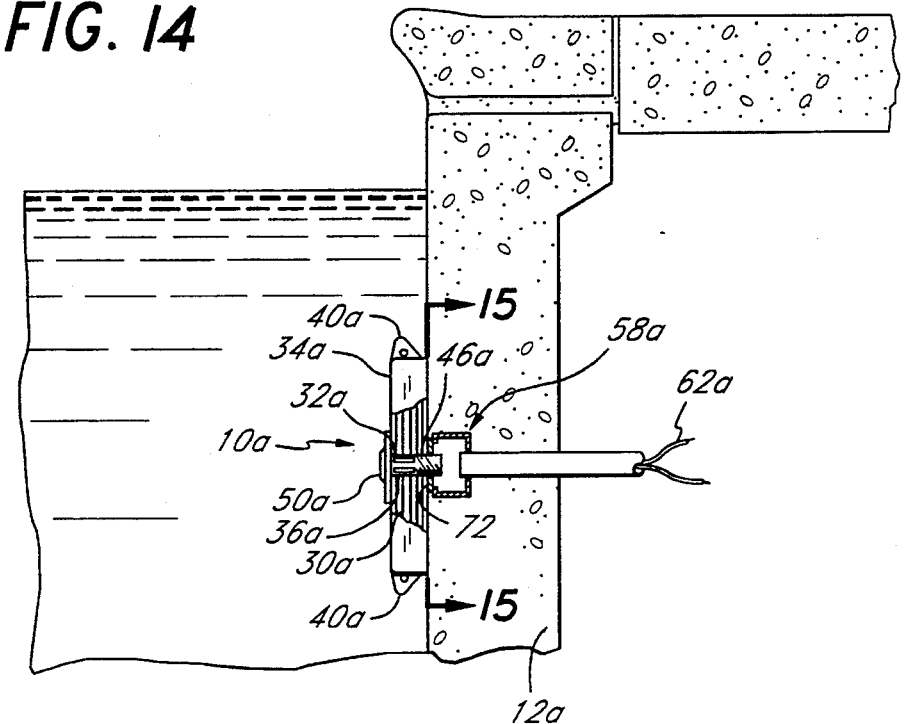
FIG. 14 is a cross section of a pool illustrating a purifier in accordance with a second embodiment of the present invention attachment to a discharge wall fitting.
Figure 15:
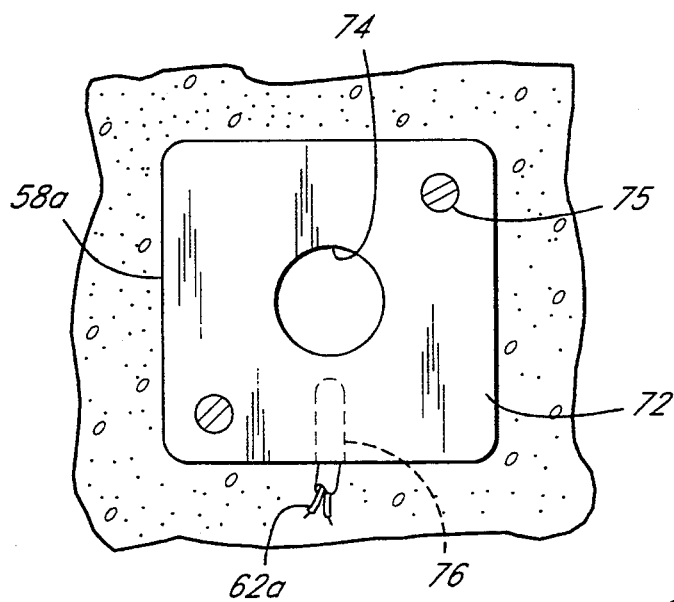
FIG. 15 is a cross-sectional view taken along lines 15—15 of FIG. 14, illustrating an attaching plate in accordance with the purifier of FIG. 14 attached to the wall fitting.

FIGS. 14 through 19 illustrate an other embodiment of the attaching apparatus 16 for use with another type of pool fitting 58. Where appropriate, like numbers with an "a" suffix are used to indicate like parts of the two embodiments for ease of understanding. Instead of a directional type fitting 58, as previously described, the fitting, as shown in FIG. 14, comprises a wall fitting 58a surrounding an end of the water circulation line 18. If the wall fitting 58a contains a grill or diffuser, it is removed and not used. As depicted in FIGS. 14 and 15, a plate 72 attaches over the fitting 58a in place of a grill.

Figure 16:
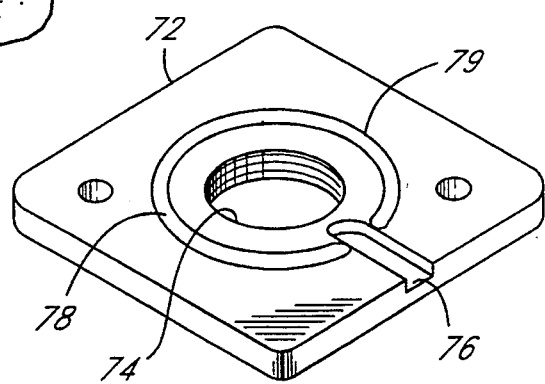
FIG. 16 is a rear perspective view of the wall plate shown removed from the purifier for clarity.

Referring to FIG. 15, the plate 72 is constructed of thermoplastic and defines a threaded centrally located hole 74 and an offset wire receiving slot 76 near the hole. An O-ring 78, as seen in FIG. 16, fits into a groove 79 and partially encircles the hole 74, terminating at the slot 76. As shown in FIG. 15, the slot 76 permits the wires 62 to extend from the wall fitting 70 towards the purifier 10.

The installation of the purifier 10 is identical to the procedure described above, except that fasteners 75 (FIG. 15), such as, for example, screws, securely fasten the plate 74 to the pool wall 12. The nipple 46 is threaded into the hole 74 and the enclosure abuts against the plate, compressing the O-ring 78 between the plate 74 and the pool wall 12.

The plate 74 can also be used where the circulation line 18 extends to the surface of the pool wall 12. That is, the pool does not include the wall fitting 58a. The plate mounts directly to the pool wall, aligning with and covering over the end of the water circulation line 18. The attaching apparatus 16 and enclosure attach to the plate 74, as described above.

The purifier 10, as defined, provides superior descaling characteristics. In hard water, scale deposits on the edges 80 of the nipple apertures 48 and on the edges 28 of the enclosure openings 38, 39. The diverging orifice configuration of the apertures 48 and the openings 38, 39 produces an increased flow rate through these orifices, as discussed in detail above. The increase flow rate prevents massive scale growth across the openings 38, 39 and the apertures 48. The purifier 10 additionally exhibits greater descaling qualities if used with a power supply reversing the polarity of electricity supplied to the electrodes 20, as described in U.S. Pat. No. 4,992,156. These descaling features extends the life of the purifier 10.

The purifier 10 is also easily retrofitted to a pool 14 by using the existing circulation line fitting 58. The installation, as described above, is simple and cost efficient. Through a few simple installation steps, the nipple 46 couples with the circulation line 18 and extends outwardly from the pool wall 12. The enclosure 34 slips over the nipple 46 and the cap 82 secures the enclosure 34 onto the nipple 46. Installation does not require aligning the enclosure aperture 36 with the threaded hole 65 of the directional discharger 64. Nor does the installation of the purifier 10 require simultaneously coupling the enclosure 34 and the nipple 46 with the directional discharger 64. Thus, installation is usually completed from the pool deck reaching into the pool 14.

In assembly, the enclosure 34 fits flat against the pool wall 12 or smoothly blends with the contoured pool wall 12. This unobtrusive position prevents interference with pool sweeping equipment. The low profile of the purifier 10 as installed also reduces the possibility of interfering with swimmers and is generally inconspicuous—particularly with no wires 62 visible from the outside.

Although this invention is described in terms of certain preferred embodiments, other embodiments that are apparent to those of ordinary skill in the art are also within the scope of this invention. Accordingly, the scope of the invention is intended to be defined only by the claims which follow.

I claim:

1. A water sanitizing apparatus for mounting in a pool having a water circulation line, said apparatus comprising:

an electrolytic cell having a plurality of electrodes;
   an enclosure having an internal cavity, said electrodes being positioned within said internal cavity; and
   a nozzle having an elongated tubular shape defining an internal flow passage to receive water from said circulation line and to discharge water into said internal cavity between said electrodes, said nozzle having an edge defining an aperture, at least a portion of said edge angling outwardly in a radial direction such that said aperture has an area which increases in size in a downstream direction towards said electrodes, said aperture of said nozzle being positioned within said internal cavity.

2. A water sanitizing apparatus for mounting in a pool having a water circulation line, said apparatus comprising:

an electrolytic cell having a plurality of electrodes;
   an enclosure having an internal cavity, said electrodes being position within said internal cavity; and
   a nozzle having an elongated tubular shape defining an internal flow passage to receive said water from said circulation line, said nozzle having a plurality of edges which define a plurality of apertures equally spaced around the circumference of said nozzle, at least a portion of each of said edges angling outwardly in a radial direction giving said aperture an area which increases from an inner surface of said nozzle to an outer surface of said nozzle, each of said apertures of said nozzle being positioned within said internal cavity.

3. The apparatus of claim 2, wherein said nozzle defines four apertures.

4. The apparatus of claim 2, wherein said electrodes are juxtaposed within said interior cavity and said apertures have a rectangular configuration of a length equal to at least a distance across the juxtaposed series of electrodes.

5. A water sanitizing apparatus for mounting in a pool having a water circulation line, said apparatus comprising:

an electrolytic cell having a plurality of electrodes;
   an enclosure having an internal cavity, said electrodes being positioned within said internal cavity; and
   a nozzle having an elongated tubular shape defining an internal flow passage to receive water from said circulation line, said nozzle having an edge defining an aperture, at least a portion of said edge angling outward in a radial direction giving said aperture an area which increases from an inner surface of said nozzle to an outer surface of said nozzle, said aperture having a minimum area sized to produce a sufficient flow rate of water through said aperture to break off scale formations projecting from said nozzle edge, said aperture of said nozzle being positioned within said internal cavity.

6. The apparatus of claim 5, wherein said nozzle is constructed of a high molecular weight polyethylene.

7. The apparatus of claim 5, wherein said nozzle comprises a nipple and said enclosure defines an aperture and said plurality of electrodes defines a bore passing through the electrodes and aligning with said enclosure aperture, said opening and said bore receiving a cap end of said nipple, and said apparatus additionally comprising a cap removably engaging with said nipple cap end, thereby sealing said nipple cap end and securing said enclosure onto said nipple.

8. The apparatus of claim 5, wherein said enclosure includes an outlet opening allowing water, flowing from said nipple, to exit the enclosure interior cavity into the pool.

9. The apparatus of claim 8, wherein said outlet opening is defined between chamfer edges extending outwardly from the center of the enclosure.

10. The apparatus of claim 9, wherein said chamfer edges are sufficiently close together to produce an ample flow rate of water through said outlet opening to break off scale formations projecting from said chamfer edges.

11. A water sterilizing apparatus for mounting in a pool having a water circulation line, said apparatus comprising:
an enclosure having an internal cavity and a pair of openings which define an internal flow path through said internal cavity, each of said openings being defined between chamfered edges which increase in area in the radial direction, said chamfered edges being skewed relative to the direction of water flow through said aperture at an angle generally ranging between about 30° and about 60°;
an electrolytic cell having a plurality of electrodes, said electrodes being positioned within said internal cavity; and
a tubular nozzle communicating with the water circulation line and defining an aperture, said nozzle extending partially into said internal cavity, said aperture being positioned to direct a flow of water into said internal cavity and out of said openings.

12. The water sanitizing apparatus of claim 11, wherein said nozzle comprises said aperture in a side wall of said nozzle.

13. The water sanitizing apparatus of claim 11, wherein said electrodes comprise a plurality of juxtaposed electrode plates.

14. A water sanitizing apparatus for mounting in a pool having a water circulation line, said apparatus comprising
an enclosure having an internal cavity and an outlet opening, said outlet opening being defined between chamfer edges, said chamfer edges being sufficiently close together to produce an ample flow rate of water through said outlet to break off scale formations projecting from said chamfer edges; and
a tubular nipple communicating with said water circulation line and defining an aperture, said nipple extending partially into said internal cavity, said aperture being positioned to direct a flow of water into said interior cavity and out of said outlet opening.

15. A water sanitizing apparatus comprising:
an enclosure comprising an outlet opening in communication with an internal cavity of said enclosure;
an electrolytic cell having a plurality of electrodes spaced apart from one another, said electrolytic cell being housed within said internal cavity of said enclosure; and
a nozzle having an internal flow passage adapted to receive pressurized water and at least one orifice through which said pressurized water flows, said nozzle being positioned within said internal cavity so as to direct the pressurized water along a path which extends along the electrodes and through said outlet opening such that the formation of scale within the path of said pressurized water is inhibited.

* * * * *